United States Patent
Bossen et al.

(10) Patent No.: US 10,841,611 B2
(45) Date of Patent: *Nov. 17, 2020

(54) ENHANCED INTRA-PREDICTION CODING USING PLANAR REPRESENTATIONS

(71) Applicant: NTT DOCOMO, INC., Chiyoda-ku, Tokyo (JP)

(72) Inventors: Frank Jan Bossen, Mountain View, CA (US); Sandeep Kanumuri, Redmond, WA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/163,008

(22) Filed: Oct. 17, 2018

(65) Prior Publication Data

US 2019/0075318 A1 Mar. 7, 2019

Related U.S. Application Data

(63) Continuation of application No. 15/283,756, filed on Oct. 3, 2016, now Pat. No. 10,205,963, which is a
(Continued)

(51) Int. Cl.
*H04B 1/66* (2006.01)
*H04N 19/587* (2014.01)
(Continued)

(52) U.S. Cl.
CPC ........... *H04N 19/587* (2014.11); *H04N 19/11* (2014.11); *H04N 19/12* (2014.11); *H04N 19/124* (2014.11);
(Continued)

(58) Field of Classification Search
CPC .................. H04N 19/00763; H04N 19/00781
(Continued)

(56) References Cited

U.S. PATENT DOCUMENTS

2005/0129130 A1 6/2005 Shen et al.
2006/0268990 A1 11/2006 Lin et al.
(Continued)

FOREIGN PATENT DOCUMENTS

| CN | 101502124 A | 8/2009 |
|---|---|---|
| CN | 101543036 A | 9/2009 |
| WO | WO 2012/008790 A2 | 1/2012 |

OTHER PUBLICATIONS

Ugur, Kemal et al., "Description of video coding technology proposal by Tandberg, Nokia, Ericsson," *Joint Collaborative Team on Video Coding (JCT-VC) of ITU-T SG16 WP3 and ISO/IEC JTC1/SC29/WG11, 1st Meeting*, Dresden, Germany, Apr. 15-23, 2010, Document: JCTVC-A119, 6 pages.
(Continued)

*Primary Examiner* — Masum Billah
(74) *Attorney, Agent, or Firm* — Brinks Gilson & Lione

(57) ABSTRACT

The present invention provides low complexity planar mode coding in which a value of a bottom-right pixel in a prediction block is calculated from a value of at least one pixel in at least one of an array of horizontal boundary pixels and an array of vertical boundary pixels. Linear and bi-linear interpolations on the value of the bottom-right pixel and values of at least some of the horizontal and vertical boundary pixels to derive values of remaining pixels in the prediction block. A residual between the prediction block and an original block is signaled to a decoder.

2 Claims, 8 Drawing Sheets

Related U.S. Application Data continuation of application No. 13/261,843, filed as application No. PCT/US2011/066359 on Dec. 21, 2011.

(60) Provisional application No. 61/449,528, filed on Mar. 4, 2011, provisional application No. 61/425,670, filed on Dec. 21, 2010.

(51) Int. Cl.

| | | |
|---|---|---|
| *H04N 19/124* | (2014.01) | |
| *H04N 19/14* | (2014.01) | |
| *H04N 19/176* | (2014.01) | |
| *H04N 19/593* | (2014.01) | |
| *H04N 19/11* | (2014.01) | |
| *H04N 19/12* | (2014.01) | |
| *H04N 19/157* | (2014.01) | |
| *H04N 19/182* | (2014.01) | |
| *H04N 19/15* | (2014.01) | |
| *H04N 19/159* | (2014.01) | |
| *H04N 19/46* | (2014.01) | |
| *H04N 19/61* | (2014.01) | |
| *H04N 19/86* | (2014.01) | |

(52) U.S. Cl.
CPC ............ *H04N 19/14* (2014.11); *H04N 19/15* (2014.11); *H04N 19/157* (2014.11); *H04N 19/159* (2014.11); *H04N 19/176* (2014.11); *H04N 19/182* (2014.11); *H04N 19/46* (2014.11); *H04N 19/593* (2014.11); *H04N 19/61* (2014.11); *H04N 19/86* (2014.11)

(58) Field of Classification Search
USPC ......................................................... 375/240
See application file for complete search history.

(56) References Cited

U.S. PATENT DOCUMENTS

| | | | |
|---|---|---|---|
| 2008/0025411 A1 | 1/2008 | Chen et al. | |
| 2009/0310677 A1* | 12/2009 | Shiodera ................ | H04N 19/70 375/240.15 |
| 2010/0054331 A1 | 3/2010 | Haddad et al. | |
| 2010/0054617 A1* | 3/2010 | Takada ................... | H04N 19/13 382/238 |
| 2010/0208802 A1 | 8/2010 | Tsukuba et al. | |
| 2010/0290527 A1 | 11/2010 | Park et al. | |
| 2012/0093217 A1 | 4/2012 | Jeon et al. | |
| 2013/0136371 A1 | 5/2013 | Ikai et al. | |

OTHER PUBLICATIONS

Office Action and Search Report, and English language translation thereof, in corresponding Chinese Application No. 201180062138.9, dated May 21, 2014, 23 pages.
Official Action with English Translation for Russian Patent Application Serial No. 2013133861 dated Nov. 21, 2014, 14 pages.
Davies, Thomas et al., "Suggestion for a Test Model," *Joint Collaborative Team on Video Coding (JCT-VC) of ITU-T SG16 WP3 and ISO/IEC JTC1/SC29/WG11, 1st Meeting*, Dresden, Germany, Apr. 15-23, 2010, Document JCTVC-A033, 30 pages.
Kanumuri, Sandeep et al., "Enhancements to Intra Coding," *Joint Collaborative Team on Video Coding (JCT-VC) of ITU-T SG16 WP3 and ISO/IEC JTC1/SC29/WG11, 4th Meeting*, Daegu, Korea, Jan. 20-28, 2011, Document JCTVC-D235, 7 pages.
Lainema, Jani et al., "Intro Picture Coding with Planar Representation," *28th Picture Coding Symposium*, PCS2010, Nagoya, Japan, Dec. 8-10, 2010, 4 pages.
Ugur, Kemal et al., "Appendix to Description of Video Coding Technology Proposal by Tandberg Nokia Ericsson," *Joint Collaborative Team on Video Coding (JCT-VC) of ITU-T SG16 WP3 and ISO/IEC JTC1/SC29/WG11, 1st Meeting*, Dresden, Germany. Apr. 15-23, 2010, Document JCTVC-A119, 55 pages.
Ugur, Kemal et al., "Low Complexity Video Coding and the Emerging HEVC Standard," *28th Picture Coding Symposium, PCS2010*, Nagoya, Japan, Dec. 8-10, 2010, 4 pages.
Extended European Search Report in corresponding European Application No. 11851099.9, dated Jun. 9, 2015, 11 pages.
Notice of Reasons for Rejection, and English language translation thereof, in corresponding Japanese Application No. 2013-546354, dated Apr. 30, 2014, 6 pages.
Office Action in corresponding Canadian Application No. 2,822,391 dated Oct. 14, 2015, 4 pages.
Office Action, and English translation thereof, in corresponding Korean Application No. 10-2013-7018984 dated Dec. 18, 2015, 8 pages.
Office Action in corresponding European Application No. 11 851 099.9 dated Feb. 10, 2016, 9 pages.
Office Action in corresponding European Application No. 15190603.9 dated Feb. 10, 2016, 14 pages.
Extended Search Report in corresponding European Application No. 15187580.4, dated Feb. 12, 2016, 14 pages.
Office Action in corresponding European Application No. 11851099.9, dated Sep. 29, 2016, 9 pages.
Office Action in corresponding Canadian Application No. 2,900,863, dated Oct. 3, 2016, 4 pages.
Office Action in U.S. Appl. No. 13/261,843, dated Dec. 1, 2016, 16 pages.
Office Action in corresponding European Application No. 15187580.4, dated Dec. 16, 2016, 12 pages.
Office Action in corresponding European Application No. 15190603.9, dated Dec. 16, 2016, 10 pages.
Office Action in U.S. Appl. No. 13/261,843, dated Jan. 30, 2017.
Office Action, and English language translation thereof, in corresponding Chinese Application No. 201510206211.5, dated Dec. 5, 2016, 19 pages.
Office Action, and English language translation thereof, in corresponding Korean Application No. 10-2016-7018422, dated Feb. 20, 2017, 8 pages.
Office Action, and English language translation thereof, in corresponding Korean Application No. 10-2016-7018423, dated Feb. 20, 2017, 7 pages.
Office Action, and English language translation thereof, in corresponding Korean Application No. 10-2016-7018426, dated Feb. 20, 2017, 9 pages.
Office Action, and English language translation thereof, in corresponding Korean Application No. 10-2016-7018427, dated Feb. 20, 2017, 8 pages.
Office Action, and English language translation thereof, in corresponding Chinese Application No. 201510206211.5, dated Apr. 7, 2017, 10 pages.
Office Action, and English language translation thereof, in corresponding Chinese Application No. 201510205685.8, dated May 19, 2017, 19 pages.
Office Action in U.S. Appl. No. 13/261,843, dated May 30, 2017, 16 pages.
Office Action, and English language translation thereof, in corresponding Korean Application No. 10-2016-7018422, dated Aug. 28, 2017, 7 pages.
Office Action, and English language translation thereof, in corresponding Korean Application No. 10-2016-7018423, dated Aug. 28, 2017, 7 pages.
Office Action, and English language translation thereof, in corresponding Korean Application No. 10-2016-7018426, dated Aug. 28, 2017, 7 pages.
Office Action, and English language translation thereof, in corresponding Korean Application No. 10-2016-7018427, dated Aug. 28, 2017, 7 pages.
Office Action in corresponding Canadian Application No. 2,900,863, dated Sep. 11, 2017, 5 pages.
Office Action in U.S. Appl. No. 13/261,843, dated Feb. 26, 2018, 3 pages.

(56) References Cited

OTHER PUBLICATIONS

Indonesian Patent Office, Office Action in Indonesian Application No. WO201302715, dated Apr. 12, 2018, 4 pages.
Office Action in Korean Application No. 10-2018-7006900 dated Jun. 8, 2018, pp. 1-7.
Office Action in Korean Application No. 10-2018-7006899 dated Jun. 8, 2018, pp. 1-8.
Office Action in Korean Application No. 10-2018-7006898 dated Jun. 8, 2018, pp. 1-10.
Extended European Search Report in European Application No. 18167935.8 dated Jun. 26, 2018, pp. 1-10.
Extended European Search Report in European Application No. 18167914.3 dated Jun. 29, 2018, pp. 1-10.
Extended European Search Report in European Application No. 18167958.0 dated Jun. 28, 2018, pp. 1-11.
Extended European Search Report in European Application No. 18167922.6 dated Jun. 29, 2018, pp. 1-9.
Extended European Search Report in European Application No. 18167918.4 dated Jun. 26, 2018, pp. 1-10.
Extended European Search Report in European Application No. 18167909.3 dated Jun. 29, 2018, pp. 1-10.
Office Action in U.S. Appl. No. 13/261,843, dated Oct. 26, 2018, pp. 1-14.
Office Action in Japan Application No. 2018-163393, dated Aug. 6, 2019, 11 pages.
Office Action in Indian Application No. 4825/CHENP/2013, dated Dec. 31, 2018, 6 pages.
Office Action in Korea Application No. 10-2019-7008068, dated May 23, 2019, 7 pages.
Office Action in Australia Application No. 2019210559, dated May 8, 2020, 4 pages.
Office Action in U.S. Appl. No. 16/162,913, dated Jan. 22, 2020, 25 pages.
Office Action in Canada Application No. 3029045, dated Apr. 27, 2020, 6 pages.
Office Action in U.S. Appl. No. 16/162,980, dated Feb. 4, 2020, 25 pages.
Office Action in U.S. Appl. No. 16/162,956, dated Feb. 5, 2020, 23 pages.
Office Action in Australia Application No. 2019210547, dated May 25, 2020, 4 pages.
Office Action in Australia Application No. 2019210555, dated May 19, 2020, 4 pages.
Office Action in U.S. Appl. No. 16/163,063, dated Mar. 18, 2020, 29 pages.
Office Action in U.S. Appl. No. 16/163,026, dated Mar. 4, 2020, 24 pages.

\* cited by examiner

ENHANCED INTRA-PREDICTION CODING USING PLANAR REPRESENTATIONS

RELATED APPLICATIONS

The present application is a continuation of U.S. patent application Ser. No. 15/283,756 filed Oct. 3, 2016, which is a continuation of U.S. patent application Ser. No. 13/261,843 filed Jan. 29, 2014, which is a 371 application of PCT/US11/66359 filed Dec. 21, 2011, which claims the benefit of the filing date under 35 U.S.C. § 119(e) of Provisional U.S. Patent Application Ser. Nos. 61/425,670, filed Dec. 21, 2010 and 61/449,528 filed Mar. 4, 2011, the entire contents of which are hereby incorporated by reference.

BACKGROUND

1. Technical Field Text

The present invention relates to video coding and in particular to intra-frame prediction enhanced with low complexity planar prediction mode coding.

2. Background Information

Digital video requires a large amount of data to represent each and every frame of a digital video sequence (e.g., series of frames) in an uncompressed manner. It is not feasible for most applications to transmit uncompressed digital video across computer networks because of bandwidth limitations. In addition, uncompressed digital video requires a large amount of storage space. The digital video is normally encoded in some manner to reduce the storage requirements and reduce the bandwidth requirements.

One technique for encoding digital video is inter-frame prediction, or inter prediction. Inter prediction exploits temporal redundancies among different frames. Temporally adjacent frames of video typically include blocks of pixels, which remain substantially the same. During the encoding process, a motion vector interrelates the movement of a block of pixels in one frame to a block of similar pixels in another frame. Accordingly, the system is not required to encode the block of pixels twice, but rather encodes the block of pixels once and provides a motion vector to predict the other block of pixels.

Another technique for encoding digital video is intra-frame prediction or intra prediction. Intra prediction encodes a frame or a portion thereof without reference to pixels in other frames. Intra prediction exploits spatial redundancies among blocks of pixels within a frame. Because spatially adjacent blocks of pixels generally have similar attributes, the efficiency of the coding process is improved by referencing the spatial correlation between adjacent blocks. This correlation may be exploited by prediction of a target block based on prediction modes used in adjacent blocks.

Typically, an encoder comprises a pixel predictor which comprises an inter predictor, an intra predictor and a mode selector. The inter predictor performs prediction for a received image, based on a motion compensated reference frame. The intra predictor performs prediction for the received image based on already processed parts of the current frame or picture. The intra predictor further comprises a plurality of different intra prediction modes and performs prediction under the respective prediction modes. The outputs from the inter predictor and the intra predictor are supplied to the mode selector.

The mode selector determines which coding method is to be used, the inter prediction coding or the intra prediction cording, and, when the intra prediction coding is to be used, determines which mode of the intra prediction coding is to be used among the plurality of intra prediction modes. In the determining process, the mode selector uses cost functions to analyze which encoding method or which mode gives the most efficient result with respect to coding efficiency and processing costs.

The intra prediction modes comprise a DC mode and directional modes. The DC mode suitably represents a block whose pixel values are constant across the block. The directional modes are suited to represent a block which has a stripe pattern in a certain direction. There is another image pattern in which the image is smooth and its pixel values gradually change in a block. The DC mode and the directional modes are not suited to predict small gradual changes in the image content and can create annoying blocking artifacts especially at low to medium bitrates. This is because when blocks with gradually changing pixel values are encoded, the AC coefficients of the blocks tend to be quantized to zero, while the DC coefficients have non-zero values.

In order to cope with this problem, the intra prediction modes under the H.264/AVC standard additionally include a planar mode to represent a block with a smooth image whose pixel values gradually change with a small planar gradient. Under the planar mode of the H.264/AVC standard, a planar gradient is estimated and signaled in a bitstream to a decoder.

SUMMARY OF THE INVENTION

The present invention provides a low complexity planar mode coding which can improve the coding efficiency of the intra prediction coding. In the present invention, under the planar prediction mode, an encoder calculates a value of a bottom-right pixel in a prediction block from a value of at least one pixel in at least one of an array of horizontal boundary pixels and an array of vertical boundary pixels. The encoder further performs linear and bi-linear interpolations on the value of the bottom-right pixel and values of at least some of the horizontal and vertical boundary pixels to derive values of remaining pixels in the prediction block.

In one aspect of the present invention, the encoder signals a residual between the prediction block and an original block in a bitstream to a decoder.

In another aspect of the present invention, the value of the bottom-right pixel is calculated, using one of the following three equations:

$$P_P(N,N) = ((P_C(N,0) + P_C(0,N)) \gg 1), \quad (a)$$

where $P_P(N,N)$ denotes the value of the bottom-right pixel, and $P_C(N,0)$ and $P_C(0,N)$ denote values of boundary pixels referenced;

$$P_P(N,N) = w_h \times P_C(N,0) w_v \times P_C(0,N), \quad (b)$$

where $w_h$ and $w_v$ are weights determined, using $P_C(0,1:N)$ and $P_C(1:N,0)$. For example, $w_h$ and $w_v$ are calculated as follows:

$$w_h = \frac{\text{var}(P_C(1:N, 0))}{\text{var}(P_C(1:N, 0)) + \text{var}(P_C(0, 1:N))}$$

$$w_v = \frac{\text{var}(P_C(0, 1:N))}{\text{var}(P_C(1:N, 0)) + \text{var}(P_C(0, 1:N))}$$

where the operator "var( )" represents an operation to computer a variance; and $$P_P(N,N) = ((P_C^f(N,0) + P_C^f(0,N)) \gg 1), \quad (c)$$

where $P_C^f(0,N) = f(P_C(0,0), P_C(0,1), \ldots, P_C(0,2N))$ and $P_C^f(N,0) = f(P_C(0,0), P_C(1,0), \ldots, P_C(2N,0))$, and $y = f(x_0, x_1, \ldots, x_{2N})$ represents an arithmetic operation.

The arithmetic operation may be one of:

$$y = f(x_0, x_1, \ldots, x_{2N}) = \frac{x_{N-1} + 2x_N + x_{N+1}}{4}; \text{ and}$$

$$y = f(x_0, x_1, \ldots, x_{2N}) = x_{2N}.$$

In another aspect of the present invention, a primary set of transform kernel $H^N(i,j)$ is switched to a secondary set of transform kernel $G^N(i.,j)$. The encoder transforms the residual, using the secondary set of transform kernel $G^N(i.,j)$.

The secondary set of transform kernel $G^N(i.,j)$ may be defined by one of the following equations:

$$(a) \; G^N(i, j) = k_i \times \sin\left(\frac{(2i-1)j\pi}{2N+1}\right);$$

$$(b) \; G_F^N(i, j) = k_i \times \sin\left(\frac{(2i-1)(2j-1)\pi}{4N}\right), \forall \; 1 \le i, j \le N; \text{ and}$$

$$(c) \; G^N(i, j) = k_i \times \cos\left(\frac{(i-1)(2j-1)\pi}{2N}\right).$$

In another aspect of the present invention, the secondary set of transform kernel $G^N(i.,j)$ for size N×N is defined by the primary set of transform kernel $H^M(i.,j)$ for size M×M, where M>N. Specifically, the secondary set of transform kernel $G^N(i.,j)$ may be defined by $G^N(i,j) = k_i \times H^{2N}(2i, N+1-j)$, if transform kernels of size 2N×2N ($H^{2N}$) are supported, or $G^N(i,j) = H^N(i,j)$ otherwise.

The present invention also provides low complexity planar mode coding used for decoding. Under the planar mode, a decoder calculates a value of a bottom-right pixel in a prediction block from a value of at least one pixel in at least one of an array of horizontal boundary pixels and an array of vertical boundary pixels. The decoder then performs linear and bi-linear interpolations on the value of the bottom-right pixel and values of at least some of the horizontal and vertical boundary pixels to derive values of remaining pixels in the prediction block. The decoder decodes a residual signaled from the encoder which was generated under the planar mode at the encoder and adds the prediction block to the decoded residual to reconstruct image data.

DETAILED DESCRIPTION OF THE DRAWINGS AND THE PRESENTLY PREFERRED EMBODIMENTS

Figure 1:
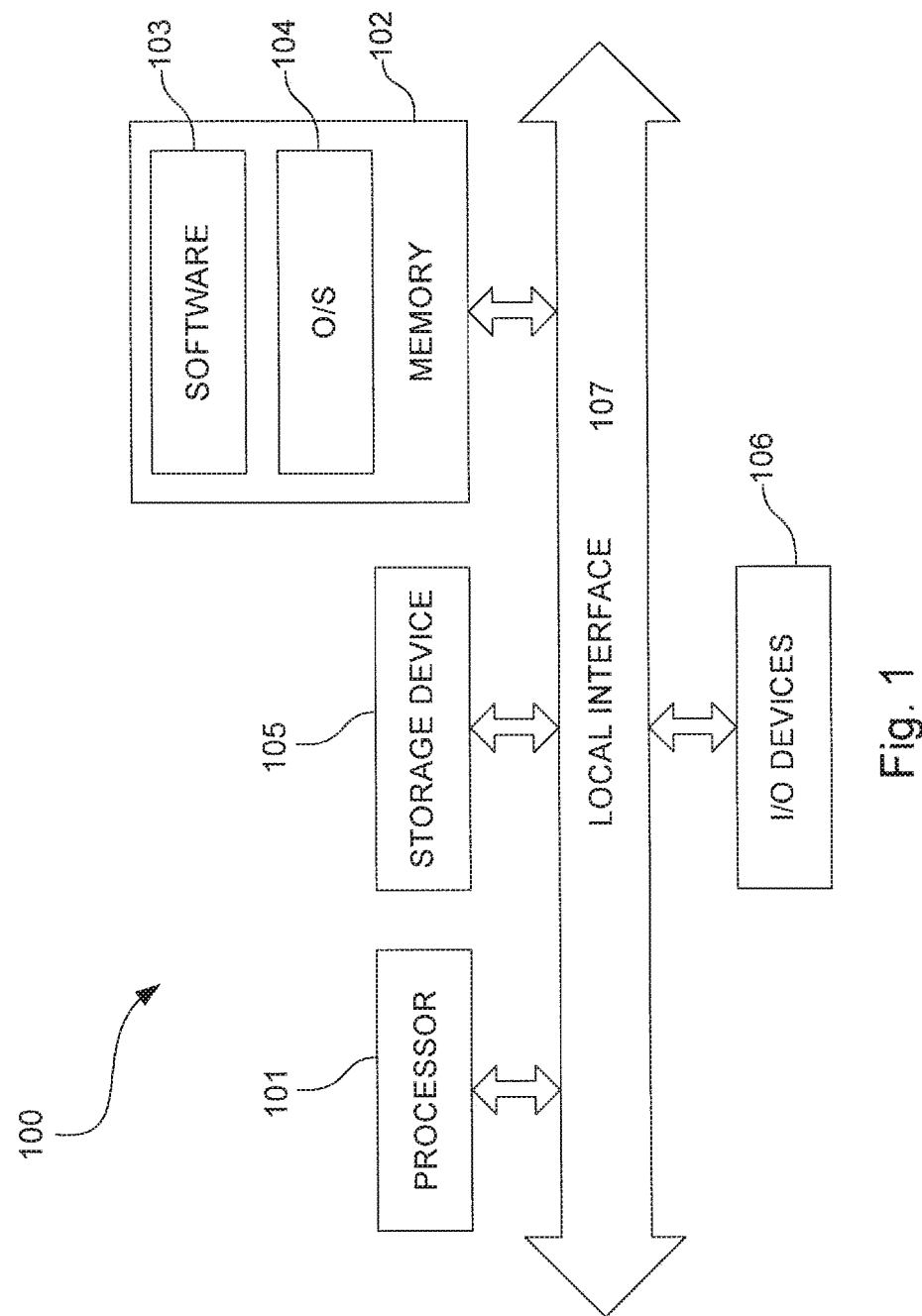
FIG. 1 is a block diagram showing an exemplary hardware architecture on which the present invention may be implemented.

FIG. 1 shows an exemplary hardware architecture of a computer 100 on which the present invention may be implemented. Please note that the hardware architecture shown in FIG. 1 may be common in both a video encoder and a video decoder which implement the embodiments of the present invention. The computer 100 includes a processor 101, memory 102, storage device 105, and one or more input and/or output (I/O) devices 106 (or peripherals) that are communicatively coupled via a local interface 107. The local interface 105 can be, for example, but not limited to, one or more buses or other wired or wireless connections, as is known in the art.

The processor 101 is a hardware device for executing software, particularly that stored in the memory 102. The processor 101 can be any custom made or commercially available processor, a central processing unit (CPU), an auxiliary processor among several processors associated with the computer 100, a semiconductor based microprocessor (in the form of a microchip or chip set), or generally any device for executing software instructions.

The memory 102 comprises a computer readable medium which can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 102 may incorporate electronic, magnetic, optical, and/or other types of storage media. A computer readable medium can be any means that can store, communicate, propagate or transport the program for use by or in connection with the instruction execution system, apparatus or device. Please note that the memory 102 can have a distributed architecture, where various components are situated remote from one another, but can be accessed by the processor 101.

The software 103 in the memory 102 may include one or more separate programs, each of which contains an ordered listing of executable instructions for implementing logical functions of the computer 100, as described below. In the example of FIG. 1, the software 103 in the memory 102 defines the computer 100's video encoding or video decoding functionality in accordance with the present invention. In addition, although not required, it is possible for the memory 102 to contain an operating system (O/S) 104. The operating system 104 essentially controls the execution of computer programs and provides scheduling, input-output control, file and data management, memory management, and communication control and related services.

The storage device 105 of the computer 100 may be one of many different types of storage device, including a stationary storage device or portable storage device. As an example, the storage device 105 may be a magnetic tape, disk, flash memory, volatile memory, or a different storage device. In addition, the storage device 105 may be a secure digital memory card or any other removable storage device 105.

The I/O devices 106 may include input devices, for example, but not limited to a touch screen, a keyboard, mouse, scanner, microphone or other input device. Furthermore, the I/O devices 106 may also include output devices, for example, but not limited to a display or other output devices. The I/O devices 106 may further include devices that communicate via both inputs and outputs, for instance, but not limited to a modulator/demodulator (modem; for accessing another device, system, or network), a radio frequency (RF), wireless or other transceiver, a telephonic interface, a bridge, a router or other devices that function both as an input and an output.

As is well known by those having ordinary skill in the art, video compression is achieved by removing redundant information in a video sequence. Many different video coding standards exist, examples of which include MPEG-1, MPEG-2, MPEG-4, H.261, H.263, and H.264/AVC. It should be noted that the present invention is not intended to be limited in application of any specific video coding standard. However, the following description of the present invention is provided, using the example of H.264/AVC standard, which is incorporated herein by reference. H.264/AVC is the newest video coding standard and achieves a significant performance improvement over the previous coding standards such as MPEG-1, MPEG-2, H.261 and H.263.

In H.264/AVC, each frame or picture of a video can be broken into several slices. The slices are then divided into blocks of 16×16 pixels called macroblocks, which can then be further divided into blocks of 8×16, 16×8, 8×8, 4×8, 8×4, down to 4×4 pixels. There are five types of slices supported by H.264/AVC. In I slices, all the macroblocks are coded using intra prediction. In P slices, macroblocks can be coded using intra or inter prediction. P slices allow only one motion compensated prediction (MCP) signal per macroblock to be used. In B slices, macroblocks can be coded using intra or inter prediction. Two MCP signals may be used per prediction. SP slices allow P slices to be switched between different video streams efficiently. An SI slice is an exact match for an SP slice for random access or error recovery, while using only intra prediction.

Figure 2:
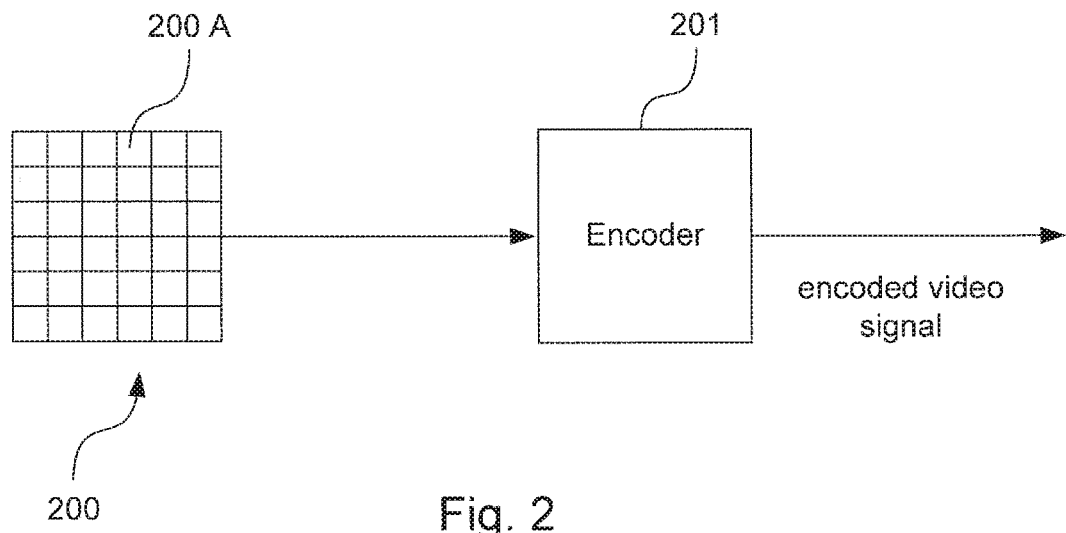
FIG. 2 is a block diagram showing a general view of a video encoder to which the present invention may be applied.

FIG. 2 shows a general view of a video encoder to which the present invention may be applied. The blocks shown in the figure represent functional modules realized by the processor 101 executing the software 103 in the memory 102. A picture of video frame 200 is fed to a video encoder 201. The video encoder treats the picture 200 in units of macroblocks 200A. Each macroblock contains several pixels of picture 200. On each macroblock a transformation into transform coefficients is performed followed by a quantization into transform coefficient levels. Moreover, intra prediction or inter prediction is used, so as not to perform the coding steps directly on the pixel data but on the differences of same to predicted pixel values, thereby achieving small values which are more easily compressed.

For each slice, the encoder 201 generates a number of syntax elements, which form a coded version of the macroblocks of the respective slice. All residual data elements in the syntax elements, which are related to the coding of transform coefficients, such as the transform coefficient levels or a significance map indicating transform coefficient levels skipped, are called residual data syntax elements. Besides these residual data syntax elements, the syntax elements generated by the encoder 201 contain control information syntax elements containing control information as to how each macroblock has been encoded and has to be decoded, respectively. In other words, the syntax elements are dividable into two categories. The first category, the control information syntax elements, contains the elements related to a macroblock type, sub-macroblock type and information on prediction modes both of a spatial and temporal types, as well as slice-based and macroblock-based control information, for example. In the second category, all residual data elements, such as a significance map indicating the locations of all significant coefficients inside a block of quantized transform coefficients and the values of the significant coefficients, which are indicated in units of levels corresponding to the quantization steps, are combined and become residual data syntax elements.

The encoder 201 comprises an entropy coder which encodes syntax elements and generates arithmetic codewords for each slice. When generating the arithmetic codewords for a slice, the entropy coder exploits statistical dependencies among the data values of syntax elements in the video signal bit stream. The encoder 201 outputs an encoded video signal for a slice of picture 200 to a video decoder 301 shown in FIG. 3.

Figure 3:
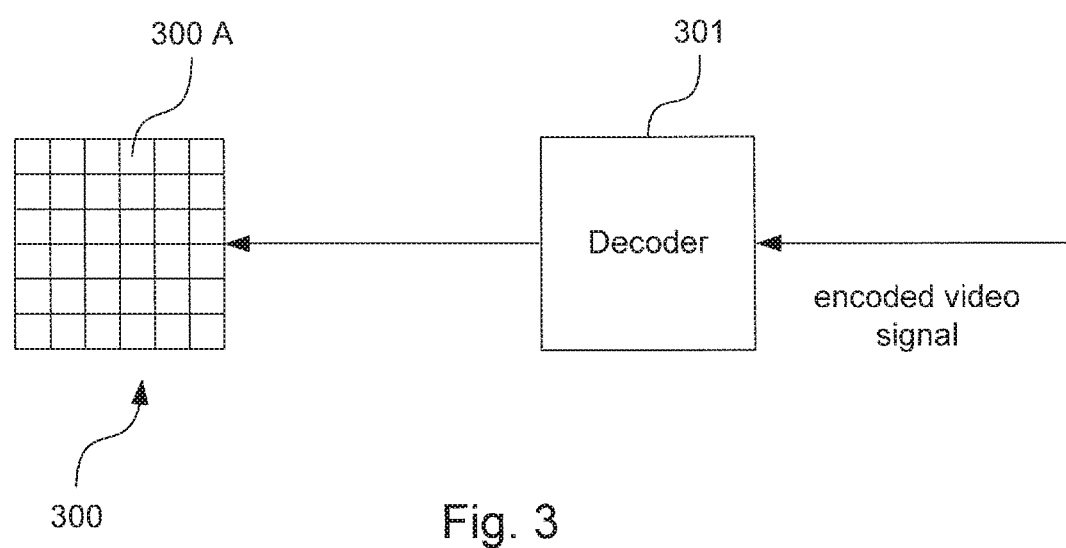
FIG. 3 is a block diagram showing a general view of a video decoder to which the present invention may be applied.

FIG. 3 shows a general view of a video decoder to which the present invention may be applied. Likewise, the blocks shown in the figure represent functional modules realized by the processor 101 executing the software 103 in the memory 102. The video decoder 301 receives the encoded video signal and first entropy-decodes the signal back into the syntax elements. The decoder 301 uses the syntax elements in order to reconstruct, macroblock by macroblock and then slice after slice, the picture samples 300A of pixels in the picture 300.

Figure 4:
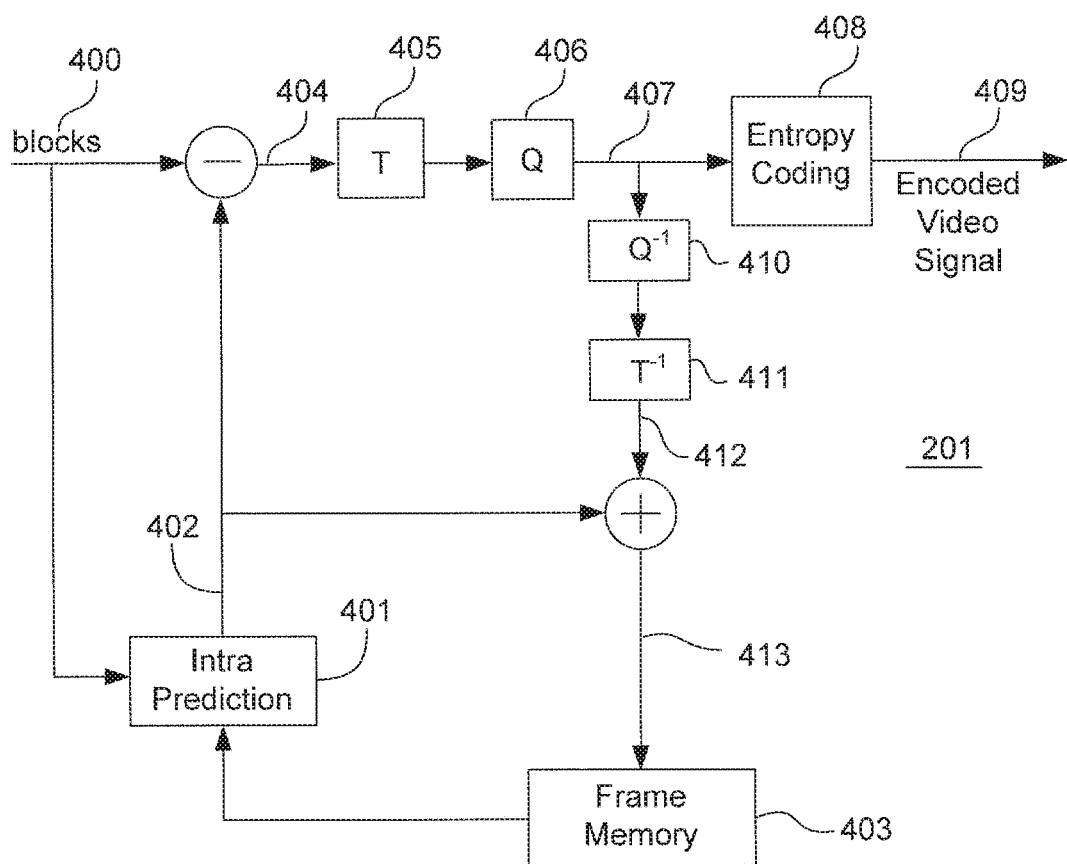
FIG. 4 is a block diagram showing the functional modules of an encoder according an embodiment of the present invention.

FIG. 4 shows the functional modules of the video encoder 201. These functional modules are realized by the processor 101 executing the software 103 in the memory 102. An input video picture is a frame or a field of a natural (uncompressed) video image defined by sample points representing components of original colors, such as chrominance ("chroma") and luminance ("luma") (other components are possible, for example, hue, saturation and value). The input video picture is divided into macroblocks 400 that each represent a square picture area consisting of 16×16 pixels of the luma component of the picture color. The input video picture is also partitioned into macroblocks that each represent 8×8 pixels of each of the two chroma components of the picture color. In general encoder operation, inputted macroblocks may be temporally or spatially predicted using inter or intra prediction. It is however assumed for the purpose of discussion that the macroblocks 400 are all I-slice type macroblocks and subjected only to intra prediction.

Infra prediction is accomplished at an intra prediction module 401, the operation of which will be discussed below in detail. The intra prediction module 401 generates a prediction block 402 from horizontal and vertical boundary pixels of neighboring blocks, which have previously been encoded, reconstructed and stored in a frame memory 403. A residual 404 of the prediction block 402, which is the difference between a target block 400 and the prediction block 402, is transformed by a transform module 405 and then quantized by a quantizer 406. The transform module 405 transforms the residual 404 to a block of transform coefficients. The quantizer 406 quantizes the transform coefficients to quantized transform coefficients 407. The quantized transform coefficients 407 are then entropy-coded at an entropy coding module 408 and transmitted (together with other information relating to the selected intra prediction mode) as an encoded video signal 409.

The video encoder 201 contains decoding functionality to perform intra prediction on target blocks. The decoding functionality comprises an inverse quantizer 410 and an inverse transform module 411, which perform inverse quantization and inverse transformation on the quantized transform coefficients 407 to produce the decoded prediction residual 412, which is added to the prediction block 402. The sum of the decoded prediction residual 410 and the prediction block 402 is a reconstructed block 413, which is stored in the frame memory 403 and will be read therefrom and used by the intra prediction module 401 to generate a prediction block 402 for decoding of a next target block 400. A deblocking filter may optionally be placed at either the input or output of the frame memory 403 to remove blocking artifacts from the reconstructed images.

Figures 5, 7:
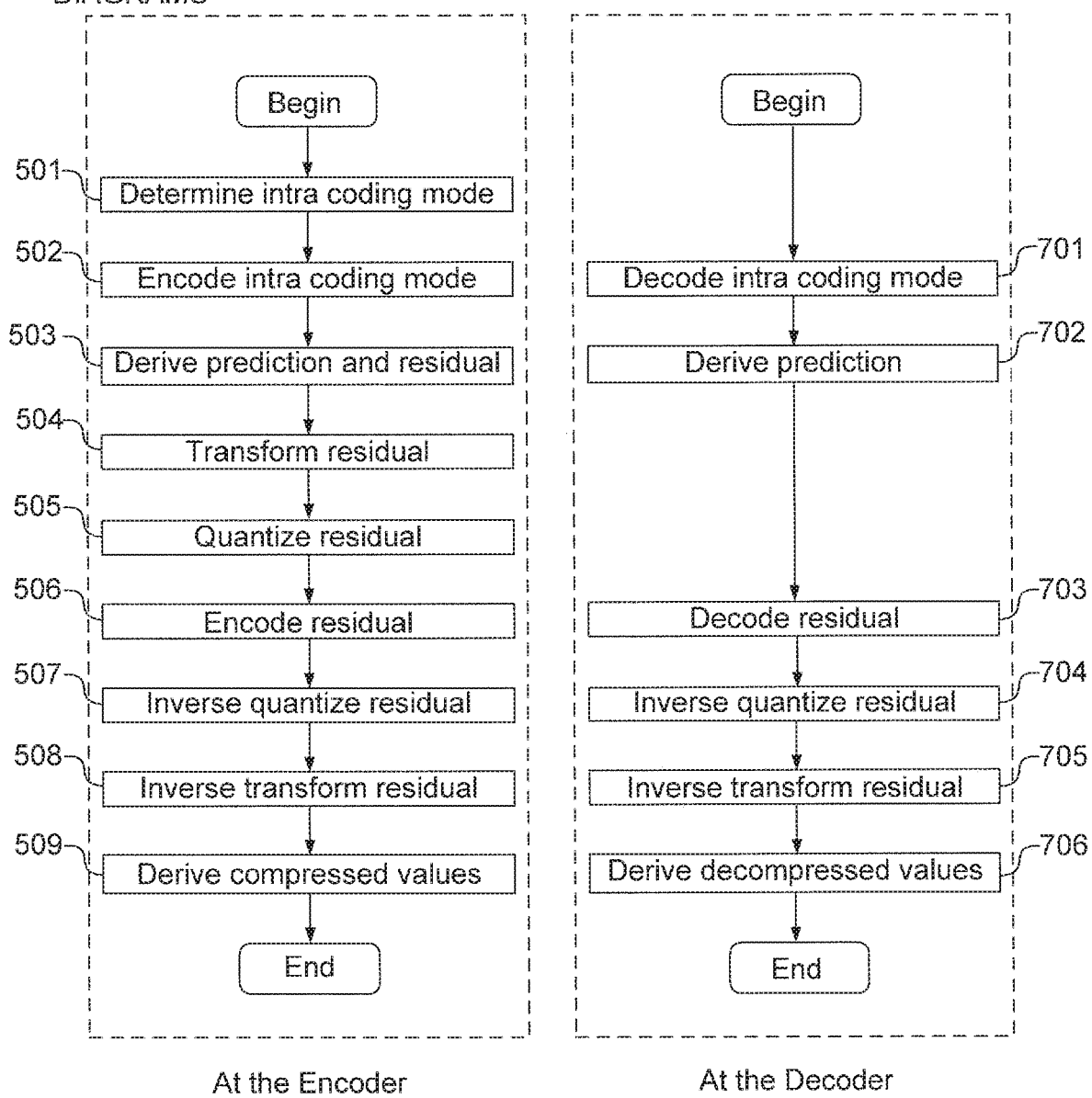
FIG. 5 is a flowchart showing an encoding process performed by the video encoder according to an embodiment of the present invention.
FIG. 7 is a diagram showing a decoding process performed by the video decoder according to an embodiment of the present invention.

FIG. 5 is a flowchart showing processes performed by the video encoder 201. In accordance with the H.264/AVC Standard, intra prediction involves predicting each pixel of the target block 400 under a plurality of prediction modes, using interpolations of boundary pixels ("reference pixels") of neighboring blocks previously encoded and reconstructed. The prediction modes are identified by positive integer numbers 0, 1, 2 . . . each associated with a different instruction or algorithm for predicting specific pixels in the target block 400. The intra prediction module 401 runs intra prediction under the respective prediction modes and generates different prediction blocks. Under a full search ("FS") algorithm, each of the generated prediction blocks is compared to the target block 400 to find the optimum prediction mode, which minimizes the prediction residual 404 or produces a lesser prediction residual 404 among the prediction modes (Step 501). The identification of the optimum prediction mode is compressed (Step 502) and will be signaled to the decoder 301 with other control information syntax elements.

Each prediction mode may be described by a general direction of prediction as described verbally (i.e., horizontal up, vertical and diagonal down left). A prediction direction may be described graphically by an angular direction. The angle corresponding to a prediction mode has a general relationship to the direction from the weighted average location of the reference pixels used to predict a target pixel to the target pixel location. In the DC prediction mode, the prediction block 402 is generated such that each pixel in the prediction block 402 is set uniformly to the mean value of the reference pixels.

Turning back to FIG. 5, the intra prediction module 401 outputs the prediction block 402, which is subtracted from the target block 400 to obtain the residual 404 (Step 503). The transform module 405 transforms the residual 404 into a block of transform coefficients (Step 504). The quantizer 406 quantizes the transform coefficients to quantized transform coefficients. The entropy coding mode 408 entropy-encodes the quantized transform coefficients (Step 506), which are sent along with the compressed identification of the optimum prediction mode. The inverse quantizer 410 inversely quantizes the quantized transform coefficients (Step 507). The inverse transform module 411 performs inverse transform to derive the decoded prediction residual 412 (Step 508), which is added with the prediction block 402 to become the reconstructed block 413 (Step 509).

Figure 6:
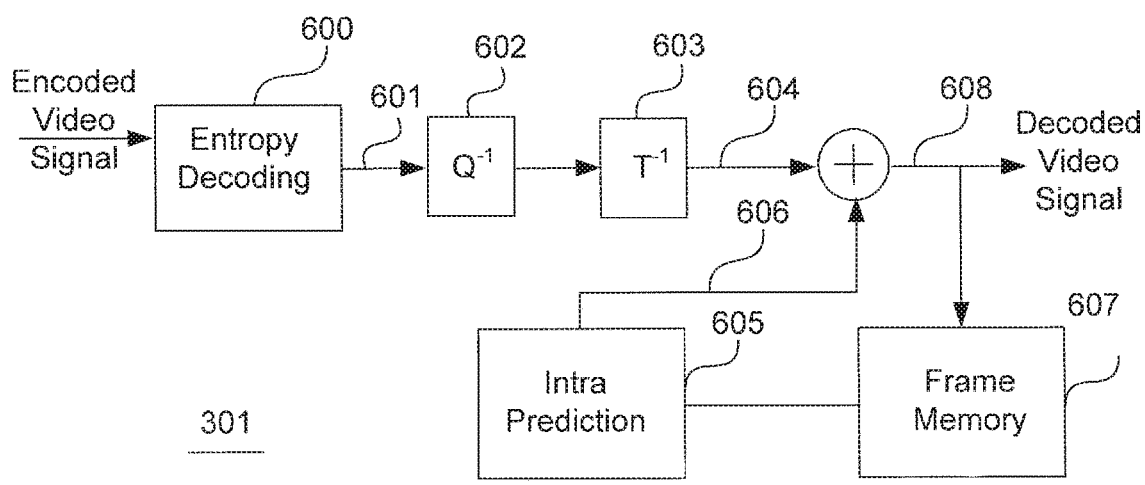
FIG. 6 is a block diagram showing the functional modules of a decoder according to an embodiment of the present invention.

FIG. 6 shows the functional modules of the video decoder 301. These functional modules are realized by the processor 101 executing the software 103 in the memory 102. The encoded video signal from the encoder 201 is first received by an entropy decoder 600 and entropy-decoded back to quantized transform coefficients 601. The quantized transform coefficients 601 are inversely quantized by an inverse quantizer 602 and inversely transformed by an inverse transform module 603 to generate a prediction residual 604. An intra prediction module 605 is notified of the prediction mode selected by the encoder 201. According to the selected prediction mode, the intra prediction module 605 performs an intra prediction process similar to that performed in Step 503 of FIG. 5 to generate a prediction block 606, using boundary pixels of neighboring blocks previously reconstructed and stored in a frame memory 607. The prediction block 606 is added to the prediction residual 604 to reconstruct a block 608 of decoded video signal. The reconstructed block 608 is stored in the frame memory 607 for use in prediction of a next block.

FIG. 7 is a flowchart showing processes performed by the video encoder 201. The video decoder 301 decodes the identification of the optimum prediction mode signaled from the video encoder 201 (Step 701). Using the decoded prediction mode, the intra prediction module 605 generates the prediction block 606, using boundary pixels of neighboring blocks previously reconstructed and stored in a frame memory 607 (Step 702). The arithmetic decoder 600 decodes the encoded video signal from the encoder 201 back to the quantized transform coefficients 601 (Step 703). The inverse quantizer 602 inversely quantizes the quantized transform coefficients to the transform coefficients (Step 704). The inverse transform module 603 inversely transforms the transform coefficients into the prediction residual 604 (Step 705), which is added with the prediction block 606 to reconstruct the block 608 of decoded video signal (Step 706).

Figure 8:
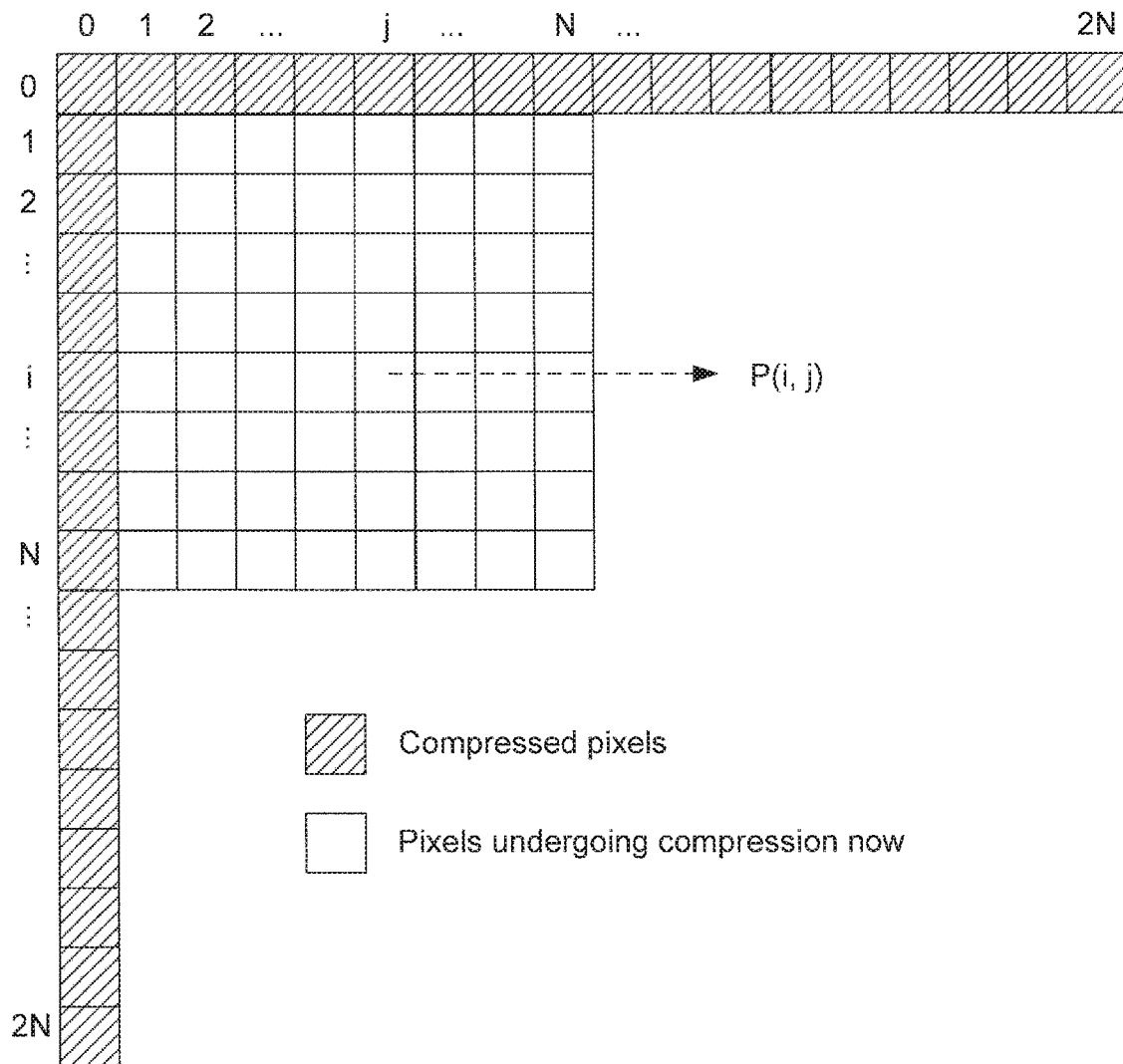
FIG. 8 is a schematic representation of a target block containing 8×8 pixels P(i,j) and reference pixels used to predict the pixels P(i,j).

The encoding process performed by the video encoder 201 may further be explained with reference to FIG. 8. FIG. 8 is a schematic representation of a target block containing 8×8 pixels P(i,j) and reference pixels used to predict the pixels P(i,j). In FIG. 8, the reference pixels consist of seventeen (17) horizontal pixels and seventeen (17) vertical pixels, where the upper left pixel is common to both horizontal and vertical boundaries. Therefore, 32 different pixels are available to generate prediction pixels for the target block. Please note that although FIG. 8 shows an 8×8 block to be predicted, the following explanation is generalized to become applicable to various numbers of pixels in different configurations. For example, a block to be predicted may comprises a 4×4 array of pixels. A prediction block may also comprise an 8×8 array of pixels, a 16×16 array of pixels, or larger arrays of pixels. Other pixel configurations, including both square and rectangular arrays, may also make up a prediction block.

Suppose that a block of pixels ($\{P(i,j):1 \leq i,j \leq N\}$) undergoes intra prediction coding, using horizontal and vertical reference pixels ($\{P(i,0):0 \leq i \leq 2N\} \cup \{P(0,j):0 \leq j \leq 2N\}$).

Where $P_O(i,j)$ denotes the original pixel values of the target block, $P_P(i,j)$ denotes the predicted pixel values, $P_R(i,j)$ denotes the residual values, $P_Q(i,j)$ denotes the compressed residual values and $P_C(i,j)$ denotes the compressed values for the pixels $P(i,j)$, the following equations define their relationship:

$$P_R(i,j)=P_O(i,j)-P_P(i,j) \forall 1 \le i,j \le N$$

$$P_T(1:N,1:N)=Q_F(H_F^N * P_R(1:N,1:N)*(H_F^N)^T)$$

$$P_Q(1:N,1:N)=H_I^N * Q_I(P_T(1:N,1:N))*(H_I^N)^T$$

$$P_C(i,j)=P_Q(i,j)+P_P(i,j), \forall 1 \le i,j \le N$$

$H_F^N$ is an N×N matrix representing the forward transform kernel. $H_I^N$ is an N×N matrix representing the inverse transform kernel. $P_T(1:N,1:N)$ represents the transformed and quantized residual signals in a bitstream. $Q_F(\ )$ represents the quantization operation and $Q_I(\ )$ represents the inverse quantization operation.

The predicted pixel values $P_P(i,j)$ are determined by an intra prediction mode performed with the reference pixels $\{P(i,0): 0 \le I \le 2N\} \cup \{P(0,j): 0 \le j \le 2N\}$. H.2641/AVC supports Intra_4×4 prediction, Intra_8×8 prediction and Intra_b 16×16 prediction. Intra_4×4 prediction is performed under nine prediction modes, including a vertical prediction mode, a horizontal prediction mode, a DC prediction mode and 6 angular prediction modes. Intra_8×8 prediction is performed under the nine prediction modes as performed in Intra_4×4 prediction. Intra_16×16 prediction is performed under four prediction modes, including one a vertical prediction mode, a horizontal prediction mode, a DC prediction mode and a planer prediction mode. For example, the predicted pixel values $P_P(i,j)$ derived under the DC prediction mode, the vertical prediction mode and the horizontal prediction mode are defined as follows:

DC Prediction Mode:

$$P_P(i,j) = \frac{\sum_{k=0}^{N} P_C(k,0) + P_C(0,k)}{2N}, \forall 1 \le i,j \le N$$

Vertical Prediction Mode:

$$P_P(i,j)=P_C(0,J), \forall 1 \le i,j \le N$$

Horizontal Prediction Mode:

$$P_P(i,j)=P_C(i,0), \forall 1 \le i,j \le N$$

Figure 9:
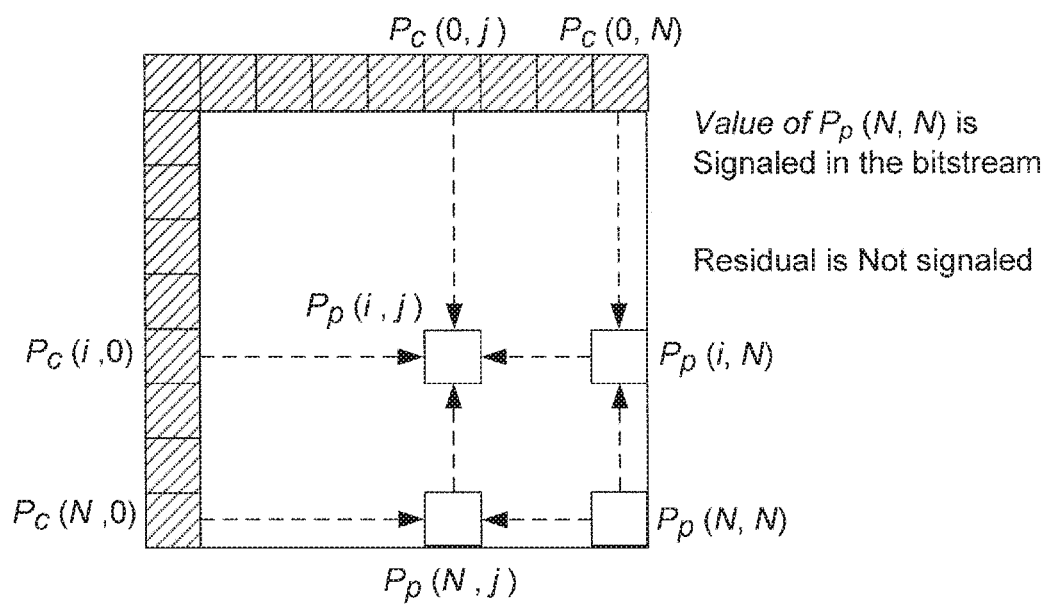
FIG. 9 is a schematic representation showing the process of generating prediction pixels according to the planar mode coding proposed in JCT-VC A119.

Recently, Proposal No. JCT-VC A119 was submitted to Joint Collaborative Team on Video Coding (JCT-VC), which is incorporated herein by reference. Proposal No. JCT-VC A119 proposes a low complexity planar mode operation which uses a combination of linear and bi-linear interpolation operations to predict gradually changing pixel values with a small planar gradient. The proposed planar mode process is schematically shown in FIG. 9. The process begins with identifying the value $P_P(N,N)$ of the bottom-right pixel in a block to be predicted. Then, linear interpolations are performed between the value $P_P(N,N)$ and reference pixel value $P_C(N,0)$ to obtain predicted pixel values $P_P(N,j)$ of the bottom row in the block. Likewise, linear interpolations are performed between the value $P_P(N,N)$ and reference pixel value $P_C(0,N)$ to obtain predicted pixel values $P_P(i,N)$ of the rightmost column in the block. Thereafter, bi-linear interpolations are performed among the predicated pixel values $P_P(N,j)$ and $P_P(i,N)$ and reference pixel values $P_C(i,0)$ and $P_C(0,j)$ to obtain the rest of the pixel values $P_P(i,j)$ in the block. The proposed planar mode process may be expressed by the following equations:

Right Column:

$$P_P(i,N) = \frac{(N-i) \times P_C(0,N) + i \times P_P(N,N)}{N},$$

$$\forall 1 \le i \le (N-1)$$

Bottom Row:

$$P_P(N,j) = \frac{(N-j) \times P_C(N,0) + j \times P_P(N,N)}{N},$$

$$\forall 1 \le j \le (N-1)$$

Rest of the Pixels:

$$P_P(i,j) = \frac{(N-i) \times P_C(0,j) + i \times P_P(N,j) + (N-j) \times P_C(i,0) + j \times P_P(i,N)}{2N},$$

$$\forall 1 \le i,j \le (N-1)$$

There are two issues to be resolved may be found in the planar mode process proposed in JCT-VC A119. In the proposed process, the value $P_P(N,N)$ of the bottom-right pixel is signaled in a bitstream to the decoder and used to decode the target block at the decoder. In other words, the decoder needs the value of the bottom-right pixel to perform prediction under the proposed planar mode. Also, in the proposed process, the residual is not derived under the planar mode and thus not signaled to the decoder. Omission of residual signaling may contribute to reduction of encoded video data to be transmitted but limits the application of the planar mode to low bit-rate video coding.

The planar mode according to the present invention is designed to resolve the above-mentioned issues associated with the planar mode process proposed in JCT-VC A119. According to an embodiment of the present invention, the value $P_P(N,N)$ of the bottom-right pixel is derived from the reference pixels. Therefore, there is no need to signal the pixel value $P_P(N,N)$ of the bottom-right pixel to the decoder. In another embodiment of the present invention, the prediction block formed under the planar mode is used to derive a residual, which is transformed and quantized for signaling to the decoder. The application of conventional discrete cosine transform (DCT) and quantization with a mid or coarse quantization parameter tends to yield zero AC coefficients and non-zero DC coefficients from residuals obtained under the planar mode. To avoid this, an embodiment of the present invention uses a secondary transform kernel, instead of the primary transform kernel, to transform a residual obtained under the planar mode. Also, another embodiment performs adaptive quantization under the planar mode in which the quantization parameter changes adaptively according to the spatial activity in the target block.

In an embodiment of the present invention, the value $P_P(N,N)$ of the bottom-right pixel is calculated from the reference pixels. The value $P_P(N,N)$ is calculated according to one of the following three methods:

Method 1:

$$P_P(N,N)=((P_C(N,0)+P_C(0,N)) >> 1),$$

where the operator ">>" represents a right-shift operation with or without rounding.

Method 2:

$$P_P(N,N) = w_h \times P_C(N,0) + w_v \times P_C(0,N),$$

where $w_h$ and $w_v$ are weights determined, using $P_C$ (0,1:N) and $P_C$ (1:N,0). For example, $w_h$ and $w_v$ are calculated as follows:

$$w_h = \frac{\text{var}(P_C(1:N, 0))}{\text{var}(P_C(1:N, 0) + \text{var}(P_C(0, 1:N))}$$

$$w_v = \frac{\text{var}(P_C(0, 1:N))}{\text{var}(P_C(1:N, 0) + \text{var}(P_C(0, 1:N))}$$

where the operator "var( )" represents an operation to computer a variance.

Method 3:

$$P_P(N,N) = ((P_C^f(N,0) + P_C^f(0,N)) >> 1),$$

where $P_C^f(0,N) = f(P_C(0,0), P_C(0,1), \ldots, P_C(0,2N))$ and $P_C^f(N,0) = f(P_C(0,0), P_C(1,0), \ldots, P_C(2N,0))$. $y = f(x_0, x_1, \ldots, x_{2N})$ represents an arithmetic operation. In an embodiment of the present invention, the arithmetic operation is defined as $$y = f(x_0, x_1, \ldots, x_{2N}) = \frac{x_{N-1} + 2x_N + x_{N+1}}{4}.$$

In another embodiment of the present invention, the arithmetic operation is simply defined as $y = f(x_0, x_1, \ldots, x_{2N}) = x_{2N}$. Please note that in the present invention, the value $P_P(N,N)$ of the bottom-right pixel is not signaled to the decoder. Instead, the decoder calculates the value $P_P(N,N)$ according to the method adopted by the encoder, which may be predetermined or the identification of which may be signaled to the decoder.

Figure 10:
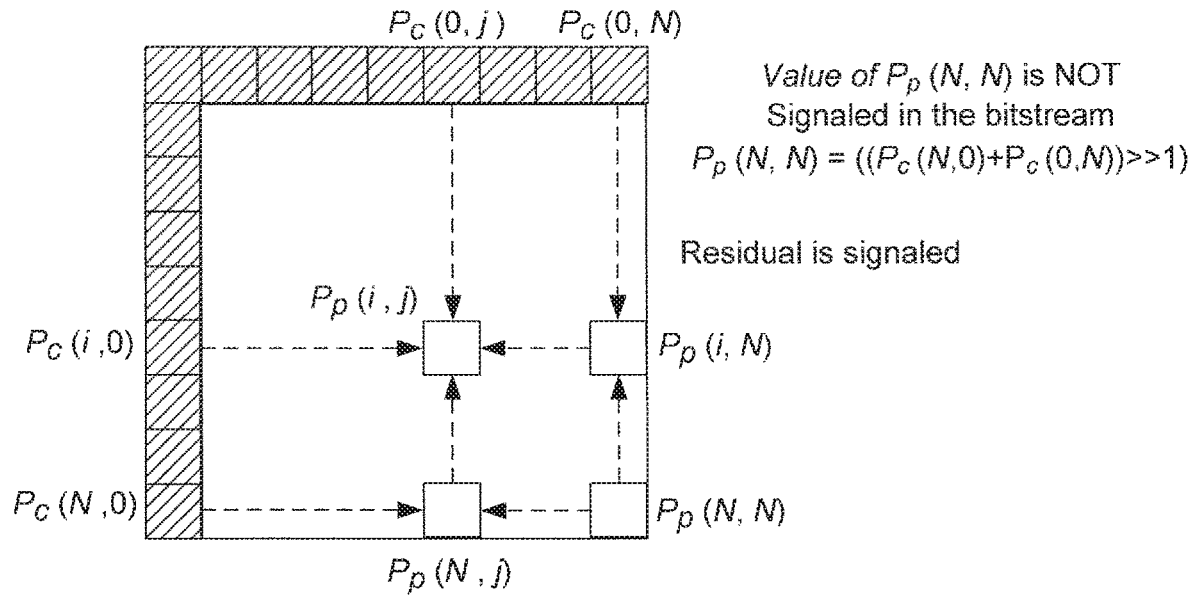
FIG. 10 is a schematic representation showing the process of generating prediction pixels according to the planar mode coding of the present invention.
Figure 11:
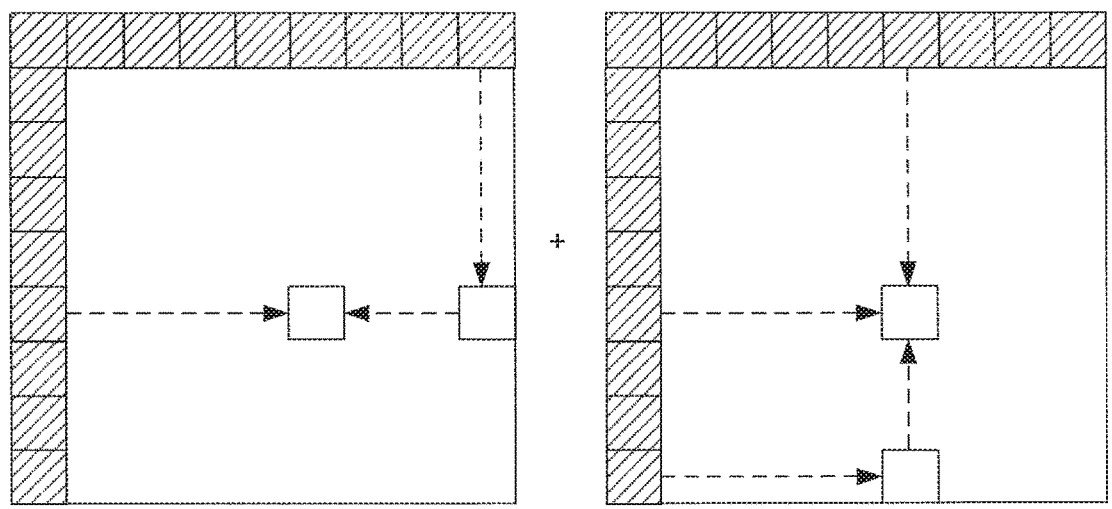
FIG. 11 is another schematic representation showing the process of generating prediction pixels according to the planar mode coding of the present invention.

FIG. 10 is schematic view showing the process of predicting pixel values performed under the planar mode according to the embodiment of the present invention, in which above Method 1 is implemented. The process begins with calculating the value $P_P(N,N)$ of the bottom-right pixel in a block, using Method 1. After the value $P_P(N,N)$ is calculated, linear interpolations are performed between the value $P_P(N,N)$ and reference pixel value $P_C(N,0)$ to obtain predicted pixel values $P_P(N,j)$ of the bottom row in the block. Likewise, linear interpolations are performed between the value $P_P(N,N)$ and reference pixel value $P_C(0,N)$ to obtain predicted pixel values $P_P(i,N)$ of the right-most column in the block. Thereafter, bi-linear interpolations are performed among the predicted pixel values $P_P(N,j)$ and $P_P(i,N)$ and reference pixel values $P_C(i,0)$ and $P_C(0,j)$ to obtain the rest of the pixel values $P_P(i,j)$ in the block. As shown by the following equations and FIG. 11, Method 1 can simplify the operation of predicting the pixel values $P_P(i,j)$ in a target block:

$$P_P(i,j) = ((P_P^h(i,j) + P_P^v(i,j)) >> 1),$$

$$\forall\ 1 \leq i, j \leq N, \text{where}$$

$$P_P^h(i,j) = \frac{(N-j) \times P_C(i,0) + j \times P_C(0,N)}{N}$$

and $$P_P^v(i,j) = \frac{(N-i) \times P_C(0,j) + i \times P_C(N,0)}{N}$$

if fractional accuracy is needed. This may, be implemented using integer arithmetic without divisions as follows:

$$P_P(i,j) = ((P_P^h(i,j) + P_P^v(i,j)) >> (1 + \log_2 N)), \forall 1 \leq i,j \leq N,$$

where $P_P^h(i,j) = (N-j) \times P_C(i,0) + j \times P_C(0, N)$ and $P_P^v(i,j) = (N-i) \times P_C(0,j) + i \times P_C(N,0)$ If integer accuracy suffices, $P_P^h(i,j)$ and $P_P^v(i,j)$ may be expressed as follows:

$$P_P^h(i,j) = ((N-j) \times P_C(i,0) + j \times P_C(0,N)) >> (\log_2 N)$$

$$P_P^v(i,j) = ((N-i) \times P_C(0,j) + i \times P_C(N,0)) >> (\log_2 N)$$

where $P_P(i,j) = ((P_P^h(i,j) + P_P^v(i,j)) >> 1)$, $\forall 1 \leq i,j \leq N$ Method 1 may be modified as follows:

$$P_P(i,j) = ((P_P^h(i,j) + P_P^v(i,j)) >> 1),$$

$$\forall\ 1 \leq i, j \leq N$$

$$P_P^h(i,j) = \frac{(N-j) \times P_C(i,0) + j \times P_C^f(0,N)}{N}$$

$$P_P^v(i,j) = \frac{(N-i) \times P_C(0,j) + i \times P_C^f(N,0)}{N}$$

$$P_C^f(0,N) = f(P_C(0,0), P_C(0,1), \ldots, P_C(0,2N))$$

$$P_C^f(N,0) = f(P_C(0,0), P_C(1,0), \ldots, P_C(2N,0)),$$

where $y = f(x_0, x_1, \ldots, x_{2N})$ represents an arithmetic operation. In an embodiment of the present invention, the arithmetic operation is defined as $$y = f(x_0, x_1, \ldots, x_{2N}) = \frac{x_{N-1} + 2x_N + x_{N+1}}{4}.$$

In another embodiment of the present invention, the arithmetic operation is simply defined as $y = f(x_0, x_1, \ldots, x_{2N}) = x_{2N}$.

Method 1 may further be modified as follows:

$$P_P(i,j) = ((P_P^h(i,j) + P_P^v(i,j)) >> 1),$$

$$\forall\ 1 \leq i, j \leq N$$

$$P_P^h(i,j) = \frac{(N-j) \times P_C(i,0) + j \times P_C^f(i,N)}{N}$$

$$P_P^v(i,j) = \frac{(N-i) \times P_C(0,j) + i \times P_C^f(N,j)}{N}$$

$$P_C^f(i,N) = g(i, P_C(0,0), P_C(0,1), \ldots, P_C(0,2N))$$

$$P_C^f(N,j) = g(j, P_C(0,0), P_C(1,0), \ldots, P_C(2N,0)),$$

where $y = g(i, x_0, x_1, \ldots, x_{2N})$ represents a function which may be defined by one of the following four equations:

$$y = g(i, x_0, x_1, \ldots, x_{2N}) = x_{2N} \qquad \text{Equation 1:}$$

$$y = g(i, x_0, x_1, \ldots, x_{2N}) = x_{(N+i)} \qquad \text{Equation 2:}$$

Equation 3:

$$y = g(i, x_0, x_i, \ldots, x_{2N}) = \frac{(N-i) \times x_N + i \times x_{2N}}{N}$$

$$y = g(i, x_0, x_1, \ldots, x_{2N}) = x_{(N+1)}^f,$$  Equation 4:

where $x_{(N+1)}^f$ is a filtered value of $x_{(N+1)}$ when a filter is applied on the array $[x_0, x_1, \ldots, x_{2N}]$. In an embodiment of the present invention, the filter may be a 3-tap filter $$\frac{[1, 2, 1]}{4}.$$

In the above embodiments, it is assumed that the vertical and horizontal reference pixels $\{P(i,0):0 \leq i \leq 2N\} \cup \{P(0,j): 0 \leq j \leq 2N\}$ are all available for prediction. The reference pixels may not be available if the target block is located at a boundary of slice or frame. If the vertical reference pixels $\{P(i,0):0 \leq i \leq 2N\}$ are not available for prediction, but the horizontal reference pixels $\{P(0,j):0 \leq j \leq 2N\}$ are available, the assignment $P_C(i,0)=P_C(0,1), \forall 1 \leq i \leq 2N$ is performed to generate the vertical reference pixels for prediction. If the horizontal reference pixels $\{P(0,j):0 \leq i \leq 2N\}$ are not available for prediction but the vertical reference pixels $\{P(i,j): 0 \leq j \leq 2N\}$ are available, the assignment $P_C(0,j)=P_C(1,0)$, $\forall 1 \leq i \leq 2N$ is performed to generate the horizontal reference pixels for prediction. If neither the vertical reference pixels nor the horizontal reference pixels are available for prediction, the assignment $P_C(i,0)=P_C(0,j)=1<<(N_b-1)), \forall 1 \leq i, j \leq 2N$ is performed to generate both vertical and horizontal reference pixels. In the equation, $N_b$, represents the bit-depth used for representing the pixel values.

In an embodiment of the present invention, like prediction blocks generated under the other prediction modes, a prediction block generated under the planar mode is used to derive a residual $P_R(1:N,1:N)$, which is transformed by the transform module 405 and quantized by the quantizer 406. The transformed and quantized residual $P_T(1:N,1:N)$ is signaled in a bitstream to the decoder. Also, the transformed and quantized residual $P_T(1:N,1:N)$ is inversely transformed and quantized by the inverse transform module 410 and the inverse quantizer 411 to become a compressed residual $P_Q(1:N,1:N)$, which is stored in the frame memory 403 for use in predicting subsequent target blocks.

The entire transformed and quantized residual $P_T(1:N,1:N)$ may be signaled in a bitstream to the decoder. Alternatively, only a part of the residual $P_T(1:K,1:K)$ may be signaled in a bitstream to the decoder. K is smaller than N (K<N) and is set to a predetermined value, e.g., 1. The value of K may be signaled in a bitstream to the decoder. If the decoder receives only a part of the residual $P_T(1:K,1:K)$, it decodes the part of the residual and sets 0 to the remaining part of the residual. Although only a part of the residual is signaled to the decoder, the entire residual $P_T(1:N,1:N)$ is inversely transformed and quantized to derive a compressed residual $P_Q(1:N,1:N)$ for the purpose of predicting subsequent target blocks.

Further in another embodiment of the present invention, the quantization parameter is adaptively changed to quantize a residual generated under the planar mode. The planar mode is applied to a block with a smooth image whose pixel values gradually change with a small planar gradient. A residual from such a smooth block tends to be quantized to zero with a mid or coarse quantization parameter. To assure that quantization yields non-zero coefficients, in the embodiment of the present invention, the quantization parameter is switched to a finer quantization parameter when a residual generated under the planar mode is quantized. The quantization parameter ($QP_{Planar}$) used to quantize a residual generated under the planar mode may be defined with a base quantization parameter ($QP_{baseP}$). $QP_{baseP}$ may be set to a predetermined value representing a finer quantization parameter. If $QP_{baseP}$ is not known to the decoder, it may be signaled in a bitstream to the decoder, or more specifically signaled in the slice header or in the picture parameter set, as defined in H.264/AVC.

In an embodiment of the present invention, $QP_{Planar}$ is simply set to $QP_{baseP}$ ($QP_{Planar}=QP_{baseP}$). $QP_{baseP}$ may be defined with a sum of $QP_{baseP}$ and $QP_N$ ($QP_{Planar}=QP_{baseP}+QP_N$), where $QP_N$ is determined, using a look-up table which lists values of $QP_N$ in relation to values of N. $QP_{Planar}$ may alternatively be defined as $QP_{Planar}=QP_{baseP}+QP_{diff}(N)$. $QP_{diff}(N)$ is a function of the value N and signaled in a bitstream to the decoder, or more specifically signaled in the slice header or in the picture parameter set, as defined in H.264/AVC. The decoder determines $QP_{diff}(N)$ from the bitstream for each of the values N supported in its video codec scheme.

In another embodiment of the present invention, by adding a differential quantization parameter ($QP_{delta}$), $QP_{baseP}$ is modified as $QP_{baseP}=QP_{baseP}+QP_{delta}$. $QP_{delta}$ is a quantization parameter determined from a spatial activity in a block or group of blocks to adjust $QP_{baseP}$ adaptively to the spatial activity $QP_{delta}$ is signaled in a bitstream to the decoder. Since $QP_{delta}$ is determined from a spatial activity in a block, it may become zero depending on the image content in the block and does not affect $QP_{baseP}$ for the planar prediction mode.

Figure 12:
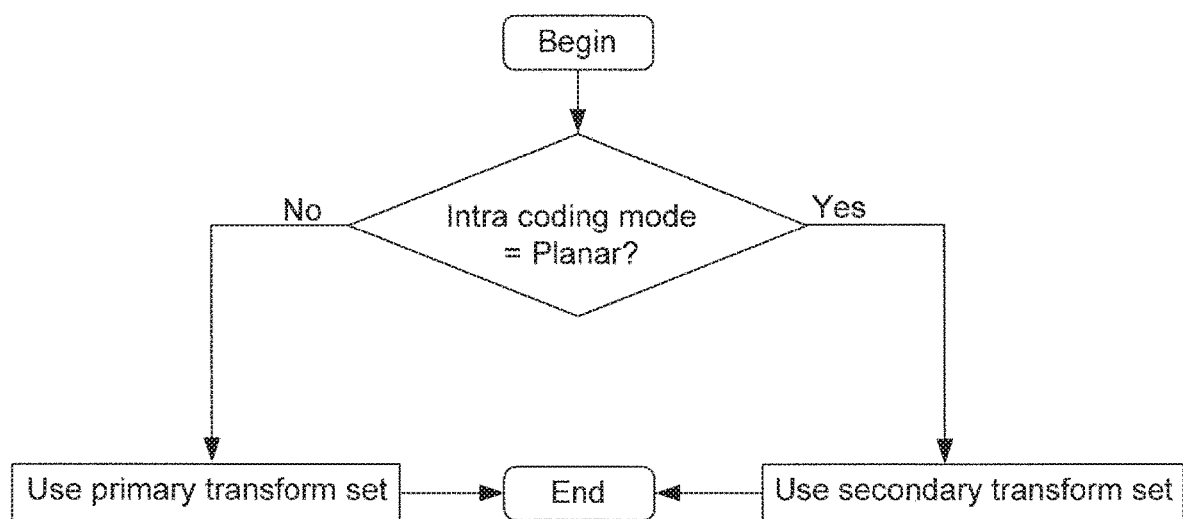
FIG. 12 is a flowchart showing the process of switching between a primary set of transform kernel and a secondary set of transform kernel.

Further in another embodiment of the present invention, $QP_{Planar}$ is determined with a normal quantization parameter $QP_{normal}$ which is used to quantize residuals generated under prediction modes other than the planar mode. In such an embodiment, $QP_{Planar}$ is determined according to one of the following five ways:

1. $QP_{Planar}=QP_{normal}$
2. $QP_{Planar}=QP_{normal}+QP_N$, where $QP_N$ is determined from a look-table which lists values of $QP_N$ in relation to values of N.
3. $QP_{Planar}=QP_{normal}+QP_{diff}(N)$, where $QP_{diff}(N)$ is a function of the value N and signaled in a bitstream to the decoder.
4. $QP_{Planar}=QP_{normal}+QP_{delta}$, where $QP_{delta}$ is a quantization parameter determined from a spatial activity in a block or group of blocks to adaptively adjust $QP_{normal}$ and is signaled in a bitstream to the decoder.
5. $QP_{Planar}=QP_{normal}+QP_N+QP_{delta}$ In another embodiment of the present invention, the transform module 405 and the inverse transform module 410 use a secondary set of forward and inverse transform kernels ($G_F^H$ and $G_I^H$) for forward and inverse transform of a residual generated under the planar mode, instead of using the primary set of forward and inverse transform kernels ($H_F^H$ and $H_I^H$). The primary set of transform kernels are used to transform residuals generated under prediction modes other than the planar mode and suited for blocks in which there is high frequency energy. On the other hand, blocks to be subjected to the planar prediction mode have low spatial activities therein and need transform kernels adapted for blocks with smooth images. In this embodiment, the transform module 405 and the inverse transform module 410 switch between the primary set of transform kernels and the secondary set of transform kernels, as shown in FIG. 12, and use the primary set of transform kernel when transforming residuals generated under prediction modes other than the planar mode, whereas using the secondary set of transform kernel when transforming residuals generated under the planar prediction mode. Please note, however, that the secondary set of transform kernel is not limited to transforming residuals generated under the planar prediction mode and may be used to transform residuals generated under prediction modes other than the planar mode.

The secondary set of forward transform kernel ($G_F^N$) may be a fixed-point approximation derived from one of the following options:

Option 1 (type-7 DST):

$$G_F^N(i,j) = k_i \times \sin\left(\frac{(2i-1)j\pi}{2N+1}\right), \forall\ 1 \le i, j \le N$$

Option 2 (type-4 DST):

$$G_F^N(i,j) = k_i \times \sin\left(\frac{(2i-1)(2j-1)\pi}{4N}\right), \forall\ 1 \le i, j \le N$$

Option 3 (type-2 DCT, commonly known as DCT):

$$G_F^N(i,j) = k_i \times \sin\left(\frac{(i-1)(2j-1)\pi}{2N}\right), \forall\ 1 \le i, j \le N$$

Option 4:
$G_F^N(i,j)=k_i \times H_F^{2N}(2i,N+1-j), \forall 1 \le i,j \le N$ if transform kernels of size 2N×2N ($N_F^{2N}$) are supported by the video codec. Otherwise, $G_F^N(i,j)=H_F^N(i,j), \forall 1 \le i,j \le N$. Therefore, in Option 4, if the smallest and largest transform sizes supported in a video code are 4×4 and 32×32, the secondary set of transform kernel for size 4×4 is derived from the primary set of transform kernel for size 8×8. Likewise, the secondary set of transform kernel for size 8×8 is derived from the primary set of transform kernel for size 16×16, and the secondary set of transform kernel for size 16×16 is derived from the primary set of transform kernel for size 32×32. However, due to the size limitation in which the largest size supported is 32×32, the secondary set of transform kernel for size 32×32 is derived from the primary set of transform kernel for size 32×32.

The scaling factor $k_i$ may be defined to satisfy $$\sum_{j=1}^{N} (G_F^N(i,j))^2 = 1, \forall\ 1 \le i \le N.$$

The scaling factor $k_i$ may be used to adjust the quantization parameter as used in H.264/AVC. The secondary set of inverse transform kernel $G_I^N$ may be derived, using the forward transform kernel $G_F^N$, from $G_I^N * G_F^N = I^N$, where $I^N$ represents the identify matrix of size N×N.

If the primary set of transform kernel satisfies the property $H_F^{2N}(i,j)=(-1)^{i+1} \times H_F^{2N}(i,2N+1-j), \forall 1 \le i,j \le 2N$, the secondary set of transform kernel defined in Option 4 is preferable. Option 4 is advantageous in that the secondary set of transform kernel does not need to be stored separately from the primary set of transform kernel because the secondary set can be derived from the primary set. If the primary set of transform kernel for size 2N×2N($H_F^{2N}$) is an approximation of type-2 DCT, the above property is satisfied, and the secondary set of transform kernel for size N×N($G_F^N$) may be an approximation of type-4 DST. If the primary set of transform kernel does not satisfy the above property, the secondary set of transform kernel defined in Option 1 is preferable.

The planar prediction mode may be selected in one of two ways. In the first way, a prediction block generated under the planar prediction mode is evaluated for coding efficiency, along with the prediction blocks generated under the other prediction modes. If the prediction block generated under the planar mode exhibits the best coding efficiency among the prediction blocks, the planar mode is selected. Alternatively, the planar mode is evaluated alone for coding efficiency. The planar prediction mode is preferable for an area where an image is smooth and its planar gradient is small. Accordingly, the content of a target block is analyzed to see the amount of high frequency energy in the block and the image discontinuities along the edges of the block. If the amount of high frequency energy is blow a threshold, and no significant discontinuities are found along the edges of the block, the planar mode is selected. Otherwise, prediction blocks generated under the other prediction modes are evaluated to select one mode. In both cases, a selection of the planar prediction mode is signaled in a bitstream to the decoder.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A video decoding method for predicting pixel values of target pixels in a target block under a planar mode, the method comprising computer executable steps executed by a processor of a video decoder to implement:
  (a) calculating a first prediction value of a respective target pixel using linear interpolation between a pixel value of a horizontal boundary pixel horizontally co-located with a respective target pixel, the horizontal boundary pixel being from among a plurality of horizontal boundary pixels on the upper side of the target block, and a pixel value of one vertical boundary pixel from among a plurality of vertical boundary pixels on the left side of the target block, wherein the first prediction value consists only of a first value derived solely from the linear interpolation between the pixel value of the horizontal boundary pixel horizontally co-located with the target pixel and the pixel value of said one vertical boundary pixel;
  (b) calculating a second prediction value of a respective target pixel using linear interpolation between a pixel value of a vertical boundary pixel vertically co-located with a respective target pixel, the vertical boundary pixel being from among a plurality of the vertical boundary pixels on a left side of the target block, and a pixel value of one horizontal boundary pixel from among a plurality of the horizontal boundary pixels, wherein the second prediction value consists only of a second value derived solely from the linear interpolation between the pixel value of the vertical boundary pixel vertically co-located with the target pixel and the pixel value of said one horizontal boundary pixel; and (c) averaging the first prediction value and the second prediction value of each target pixel to derive each prediction pixel value in a prediction block, wherein the prediction pixel value consists only of an average of the first and second prediction values, (d) wherein a prediction value of a bottom-right pixel in the target block is derived only from the vertical boundary pixels and the horizontal boundary pixels.

2. A video decoder that predicts pixel values of target pixels in a target block under a planar mode, comprising a processor of a computer system and a memory that stores programs executable by the processor to:

(a) calculate a first prediction value of a respective target pixel using linear interpolation between a pixel value of a horizontal boundary pixel horizontally co-located with a respective target pixel, the horizontal boundary pixel being from among a plurality of horizontal boundary pixels on the upper side of the target block, and a pixel value of one vertical boundary pixel from among a plurality of vertical boundary pixels on the left side of the target block, wherein the first prediction value consists only of a first value derived solely from the linear interpolation between the pixel value of the horizontal boundary pixel horizontally co-located with the target pixel and the pixel value of said one vertical boundary pixel;

(b) calculate a second prediction value of a respective target pixel using linear interpolation between a pixel value of a vertical boundary pixel vertically co-located with a respective target pixel, the vertical boundary pixel being from among a plurality of the vertical boundary pixels on a left side of the target block, and a pixel value of one horizontal boundary pixel from among a plurality of the horizontal boundary pixels, wherein the second prediction value consists only of a second value derived solely from the linear interpolation between the pixel value of the vertical boundary pixel vertically co-located with the target pixel and the pixel value of said one horizontal boundary pixel; and (c) average the first prediction value and the second prediction value of each target pixel to derive each prediction pixel value in a prediction block, wherein the prediction pixel value consists only of an average of the first and second prediction values, (d) wherein a prediction value of a bottom-right pixel in the target block is derived only from the vertical boundary pixels and the horizontal boundary pixels.

\* \* \* \* \*